(12) United States Patent
Huang et al.

(10) Patent No.: US 11,431,078 B2
(45) Date of Patent: Aug. 30, 2022

(54) DATA PROCESSING SYSTEM CAPABLE OF OPTIMIZING MULTIPLE ANTENNAS

(71) Applicant: GIGA-BYTE TECHNOLOGY CO., LTD., New Taipei (TW)

(72) Inventors: Ching-Hsun Huang, New Taipei (TW); Tse-Hsien Liao, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 44 days.

(21) Appl. No.: 17/211,803

(22) Filed: Mar. 24, 2021

(65) Prior Publication Data

US 2021/0376447 A1 Dec. 2, 2021

(30) Foreign Application Priority Data

May 29, 2020 (TW) ................................. 109118212

(51) Int. Cl.
*H01Q 1/22* (2006.01)
*H01Q 21/28* (2006.01)
*G06V 40/16* (2022.01)

(52) U.S. Cl.
CPC ......... *H01Q 1/2266* (2013.01); *G06V 40/172* (2022.01); *H01Q 1/2275* (2013.01); *H01Q 21/28* (2013.01)

(58) Field of Classification Search
CPC ..... H01Q 21/28; H01Q 1/2275; H01Q 1/2266
See application file for complete search history.

(56) References Cited

U.S. PATENT DOCUMENTS

2007/0252920 A1  11/2007  Chen et al.
2009/0295648 A1  12/2009  Dorsey et al.
(Continued)

FOREIGN PATENT DOCUMENTS

CN       104679134 A      6/2015
CN       102447966 B     11/2015
(Continued)

OTHER PUBLICATIONS

First Office Action of the corresponding China patent application No. 202010479543.1 dated Apr. 1, 2022.
(Continued)

*Primary Examiner* — Graham P Smith
(74) *Attorney, Agent, or Firm* — Idea Intellectual Limited; Margaret A. Burke; Sam T. Yip

(57) ABSTRACT

A data processing system includes a display device, a proximity sensor, a wireless data processing apparatus, and an external antenna. The display device and the wireless data processing apparatus are connected. The display device is equipped with an internal antenna indirectly connected to a wireless communication module of the wireless data processing apparatus. The external antenna is electrically connected to the wireless communication module. A data processing circuit of the wireless data processing apparatus normally controls the wireless communication module to set signal transmission strengths of the antennas by using a first antenna control mode. When the proximity sensor detects an object located close to proximity sensor, the data processing circuit controls the wireless communication module to set the signal transmission strengths by using a second antenna control mode that includes at least decreasing the signal transmission strength of the internal antenna.

18 Claims, 12 Drawing Sheets

(56) References Cited

U.S. PATENT DOCUMENTS

2010/0167672 A1   7/2010  Ahn et al.
2012/0258772 A1  10/2012  Brogle et al.
2015/0372735 A1  12/2015  Chang et al.

FOREIGN PATENT DOCUMENTS

| | | |
|---|---|---|
| CN | 108521512 A | 9/2018 |
| KR | 20050117927 A | 12/2005 |
| TW | 200803040 A | 1/2008 |
| TW | 200816657 A | 4/2008 |
| TW | 200822734 A | 5/2008 |
| TW | I330496 B | 9/2010 |
| TW | 201511537 A | 3/2015 |
| TW | I518484 B | 1/2016 |
| TW | I578771 B | 4/2017 |

OTHER PUBLICATIONS

Extended European Search Report of corresponding European Patent Application No. 21164857.1 dated Oct. 29, 2021.
Office Action of corresponding Korean patent application No. 10-2021-0035018 dated Feb. 16, 2022.
Office Action of corresponding Taiwan patent application No. 109118212 dated Aug. 25, 2021.

DATA PROCESSING SYSTEM CAPABLE OF OPTIMIZING MULTIPLE ANTENNAS

CROSS-REFERENCE TO RELATED APPLICATION

This non-provisional application claims priority under 35 U.S.C. § 119(a) to Patent Application No. 109118212 filed in Taiwan, R.O.C. on May 29, 2020, the entire contents of which are hereby incorporated by reference.

BACKGROUND

Technical Field

The present invention relates to multi-antenna configuration, and in particular, to a data processing system capable of optimizing multiple antennas.

Related Art

Wireless data transmission has been widely used in electronic devices. Most existing wireless communication technologies are to integrate small-sized antennas into electronic devices and provide options for external antennas. When the electronic device is to be moved, the external antenna usually needs to be removed first. Both the electronic device and the external antenna are moved to a new position, and then a connection is re-established, causing inconvenience in use.

In addition, the public is still worried about impact of electromagnetic waves on human health. The external antenna may be effectively kept far away from a user, but the small-sized antenna integrated in the electronic device still cannot be kept away from the user. Although turning off the small-sized antenna can effectively avoid impact of electromagnetic waves at a close range, transmission and receiving points for wireless signals are also reduced, which affect optimal configuration of the antenna and a data transmission rate.

SUMMARY

In view of the above problems, the present invention provides a data processing system capable of optimizing multiple antennas, which can effectively integrate discrete and independent electronic devices and can optimize configuration of multiple antennas.

The present invention provides a data processing system capable of optimizing multiple antennas. The data processing system includes a display device, a proximity sensor, a wireless data processing apparatus, and at least one external antenna.

The display device is equipped with a display panel, at least one internal antenna, and a display connector. The display connector is electrically connected to the display panel and the at least one internal antenna. The proximity sensor is electrically connected to the display connector, and is configured to detect whether an object is located close to the proximity sensor. The wireless data processing apparatus has a data processing circuit, a wireless communication module, and an apparatus connector. The data processing circuit and the wireless communication module are electrically connected to the apparatus connector, and the wireless communication module is electrically connected to the data processing circuit. The external antenna is directly or indirectly electrically connected to the wireless communication module.

The apparatus connector is configured to be connected to the display connector to connect the data processing circuit to the display panel, connect the proximity sensor to the data processing circuit, and connect the at least one internal antenna to the wireless communication module. The data processing circuit is configured to output a display signal to the display panel.

The data processing circuit normally controls the wireless communication module to set signal transmission strengths of the at least one internal antenna and the at least one external antenna by using a first antenna control mode, and when the proximity sensor detects that the object is located close to the proximity sensor, the data processing circuit controls the wireless communication module to set the signal transmission strengths of the at least one internal antenna and the at least one external antenna by using a second antenna control mode. The second antenna control mode includes at least decreasing the signal transmission strength of the at least one internal antenna.

In at least one embodiment of the present invention, when the proximity sensor detects that the object is located close to the proximity sensor, the data processing circuit further determines whether an input device signal is received. When the object is located close to the proximity sensor and the input device signal is received, the data processing circuit controls the wireless communication module by using the second antenna control mode.

In at least one embodiment of the present invention, when the proximity sensor detects that the object is located close to the proximity sensor, and an operating status of the wireless communication module changes, the data processing circuit controls the wireless communication module by using the second antenna control mode.

In at least one embodiment of the present invention, the wireless data processing apparatus is further equipped with a power supply unit electrically connected to the apparatus connector, where the power supply unit is configured to provide operating power to drive the data processing circuit and the wireless communication module, and the power supply unit outputs the operating power through the apparatus connector.

In at least one embodiment of the present invention, the display device further includes a display power management circuit electrically connected to the display panel and the display connector, and the apparatus connector is connected to the display connector, so that the display power management circuit receives the operating power and generates driving power to drive the display panel.

In at least one embodiment of the present invention, the display device further includes a display housing, and the display housing has a front side and a back side. The display panel is disposed on the front side, and the display power management circuit and the at least one internal antenna are disposed in the display housing.

In at least one embodiment of the present invention, the wireless data processing apparatus further includes an apparatus housing. The data processing circuit, the wireless communication module, and the power supply unit are disposed in the apparatus housing, and the apparatus connector is disposed on a surface of the apparatus housing.

In at least one embodiment of the present invention, the display housing further includes a mounting base disposed on the back side, and the display connector is disposed on the mounting base. The apparatus housing is detachably disposed on the mounting base, and is connected to the display connector through the apparatus connector.

In at least one embodiment of the present invention, in the first antenna control mode, the data processing circuit temporarily stops outputting the display signal.

In at least one embodiment of the present invention, the apparatus connector and the display connector are connected to each other through direct insertion or through a cable.

In at least one embodiment of the present invention, the display device further includes an antenna connection port electrically connected to the display connector, and at least one external antenna is connected to the antenna connection port to be electrically connected to the wireless communication module through the display connector and the apparatus connector.

In at least one embodiment of the present invention, the wireless data processing apparatus further includes an antenna connection port electrically connected to the wireless communication module, and the at least one external antenna is connected to the antenna connection port to be electrically connected to the wireless communication module.

In at least one embodiment of the present invention, the data processing circuit determines whether the wireless data processing apparatus is abnormal. If the wireless data processing is abnormal, the data processing circuit generates an abnormal warning message and drives the display panel to display the abnormal warning message.

In at least one embodiment of the present invention, the data processing circuit determines whether signal reception of the at least one internal antenna and the at least one external antenna is abnormal. If the signal reception is abnormal, the data processing circuit adjusts antenna setup parameters of the external antenna and the at least one internal antenna.

In at least one embodiment of the present invention, if the first antenna control mode is being executed, the data processing circuit updates the antenna setup parameters for the first antenna control mode. If the second antenna control mode is being executed, the data processing circuit updates the antenna setup parameters for the second antenna control mode.

In at least one embodiment of the present invention, the proximity sensor is a distance detector configured to continuously obtain a sensed distance value, and the data processing circuit continuously determines whether the sensed distance value is less than a threshold value to determine whether the object is located close to the proximity sensor.

In at least one embodiment of the present invention, the proximity sensor includes a video camera and a human face analysis module. The video camera is configured to continuously capture a detected image, and the human face analysis module is configured to receive the detected image, and continuously analyze the detected image to determine whether a human face exists in the detected image and whether a ratio of an area of the human face to an area of the detected image exceeds a threshold ratio. When the human face exists in the detected image and the ratio exceeds the threshold ratio, the data processing circuit determines that the proximity sensor detects that the object is located close to the proximity sensor.

In at least one embodiment of the present invention, the proximity sensor includes a microphone and a voice analysis module. The microphone is configured to continuously capture a sound. The voice analysis module is configured to receive the sound, and continuously analyze the sound to determine whether a voice exists in the sound, and whether a voice decibel level of the voice is greater than a threshold decibel level. When the voice exists in the sound and the voice decibel level is greater than threshold decibel level, the data processing circuit determines that the proximity sensor detects that the object is located close to the proximity sensor.

DETAILED DESCRIPTION

A term "module" used in the following description refers to an application-specific integrated circuit (ASIC), an electronic circuit, a microprocessor, a chip that executes one or more software or firmware programs, and a circuit design. The module is configured to perform various algorithms, transformations, and/or logic processing to generate one or more signals. When the module is to be implemented by software, the module may serve as a program that can be read by the chip or the circuit design and implemented in a memory through execution of the program.

Figure 1:
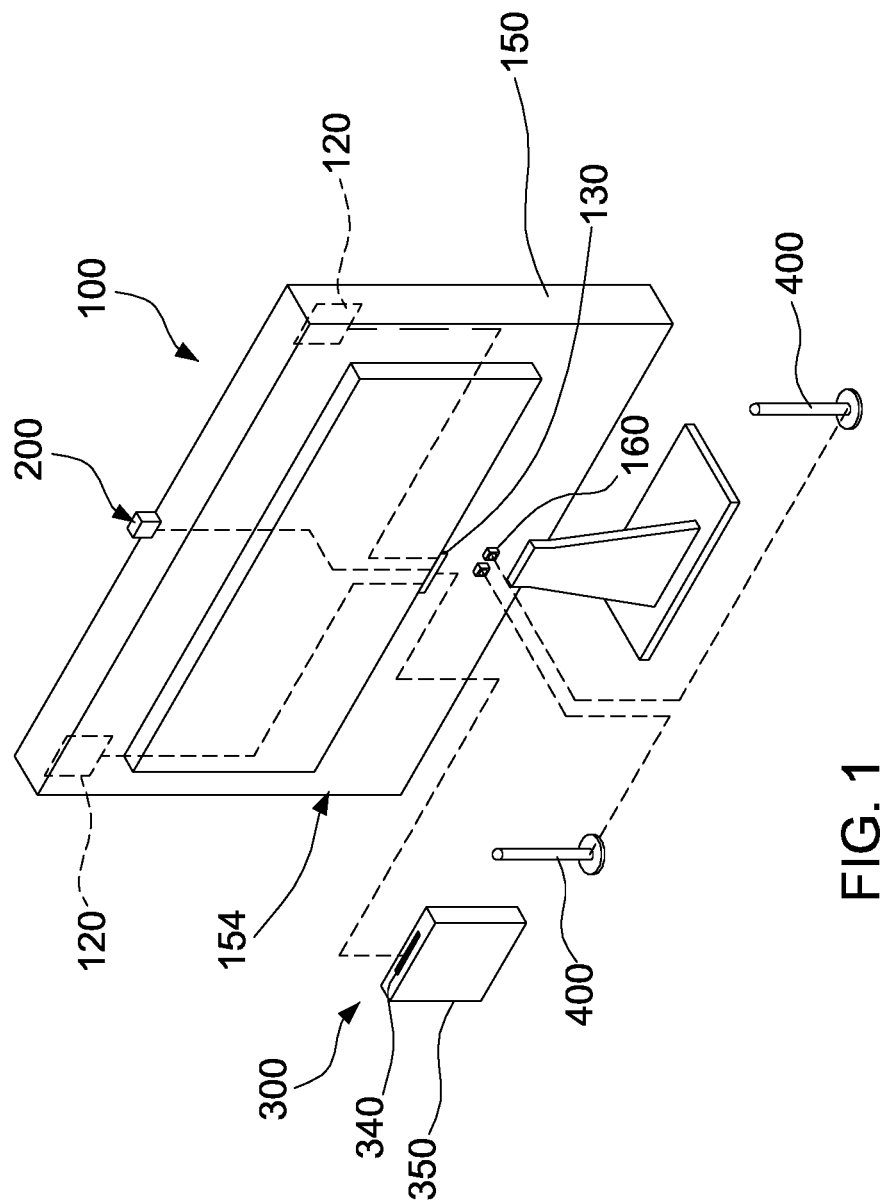
FIG. 1 is a three-dimensional view of a data processing system capable of optimizing multiple antennas according to a first embodiment of the present invention.
Figure 2:
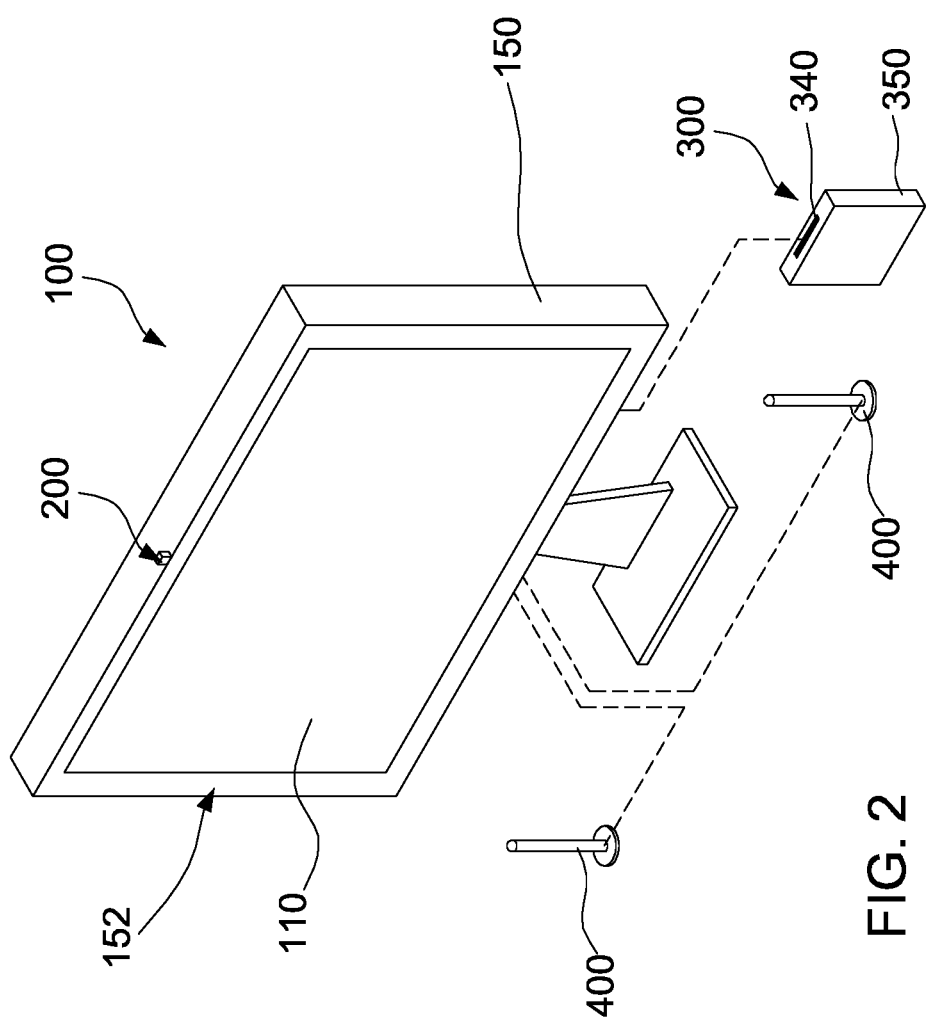
FIG. 2 is another three-dimensional view of the data processing system capable of optimizing multiple antennas according to the first embodiment of the present invention.
Figure 3:
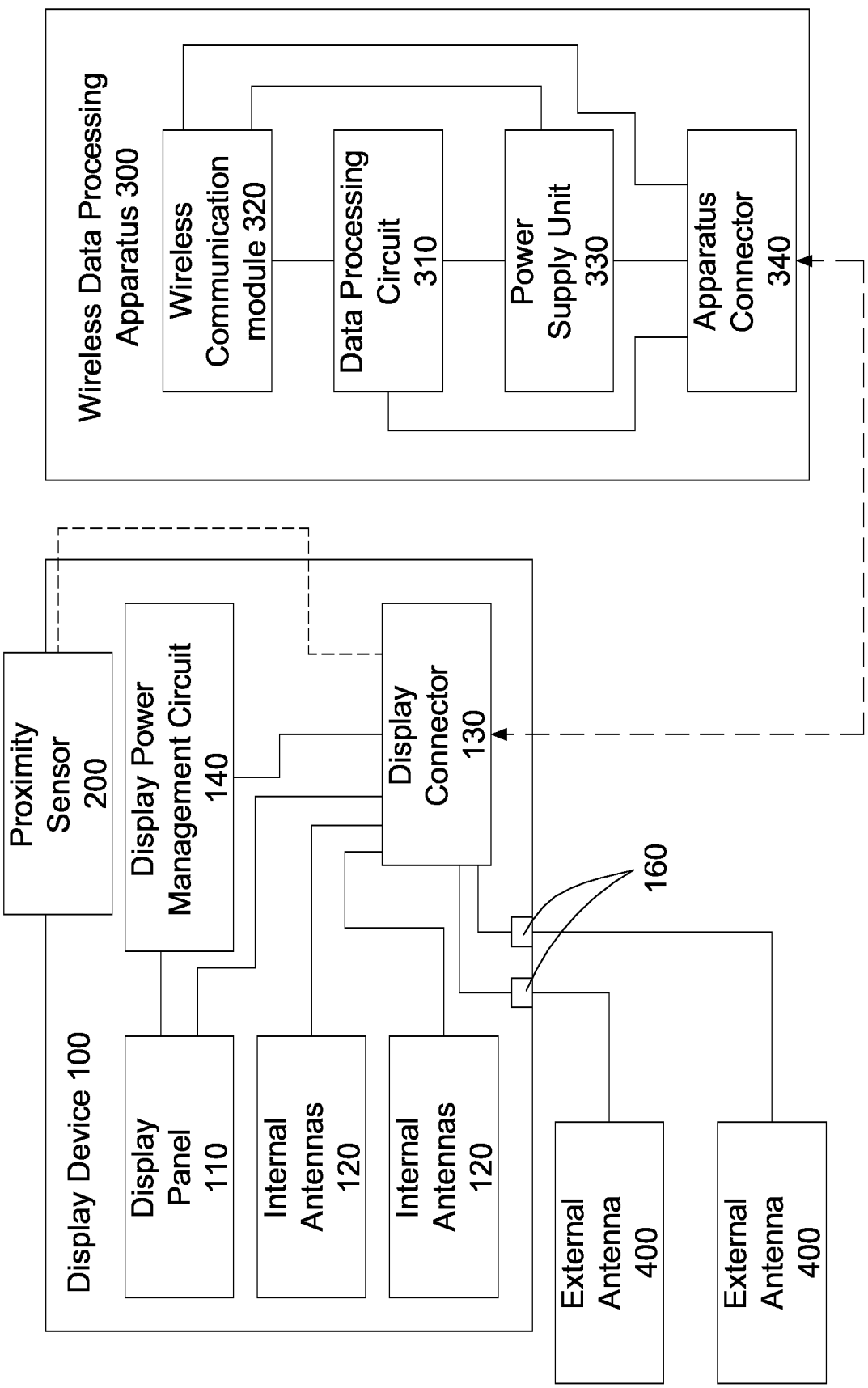
FIG. 3 is a circuit block diagram of the data processing system capable of optimizing multiple antennas according to the first embodiment of the present invention.

FIG. 1, FIG. 2, and FIG. 3 show a data processing system capable of optimizing multiple antennas according to a first embodiment of the present invention. The data processing system includes a display device 100, a proximity sensor 200, a wireless data processing apparatus 300, and one or more external antennas 400.

As shown in FIG. 1, FIG. 2, and FIG. 3, the display device 100 is equipped with a display panel 110, one or more internal antennas 120, a display connector 130, a display power management circuit 140, and a display housing 150.

The display panel 110 generally includes a display medium and a driving circuit configured to drive the display medium. The driving circuit can receive a display signal for driving the display medium to display an image. The display medium may be, but is not limited to, a liquid crystal array and an organic light-emitting diode array (OLED array).

The display connector 130 is electrically connected to the display panel 110 and the internal antenna 120. The above expression "multiple" refers to two or more. In this embodiment, a number of internal antennas 120 is exemplified as two, but an actual number is not limited to two. The display housing 150 has a front side 152 and a back side 154. The display panel 110 is disposed on the front side 152, the display power management circuit 140 and the internal antenna 120 are disposed in the display housing 150, and the display power management circuit 140 is electrically connected to the display panel 110 and the display connector 130.

As shown in FIG. 1, FIG. 2, and FIG. 3, the proximity sensor 200 is disposed on the display device 100 or adjacent to the display device 100. The proximity sensor 200 is electrically connected to the display connector 130, and is configured to detect whether an object is located close to the proximity sensor. The above object may be a human body (a user) located close to the display device 100. The proximity sensor 200 is usually disposed on the front side 152 of the display housing 150, and therefore may be configured to detect whether a user who is to view the display panel 110 is located close to the proximity sensor. In the first embodiment, the proximity sensor 200 may be a distance detector, such as an infrared distance measuring device, a laser distance measuring device, a time of flight (ToF) device, or an ultrasonic distance measuring device configured to detect a distance between the proximity sensor 200 and the above object.

As shown in FIG. 1, FIG. 2, and FIG. 3, the wireless data processing apparatus 300 has a data processing circuit 310, a wireless communication module 320, a power supply unit 330, an apparatus connector 340, and an apparatus housing 350. The data processing circuit 310, the wireless communication module 320, and the power supply unit 330 are electrically connected to the apparatus connector 340. The wireless communication module 320 is electrically connected to the data processing circuit 310 and the power supply unit 330. The power supply unit 330 is configured to provide operating power to drive the data processing circuit 310 and the wireless communication module 320. The power supply unit 330 outputs the operating power through the apparatus connector 340. The apparatus connector 340 is configured to be connected to the display connector 130, and is connected to the display connector 130 through the apparatus connector 340. The display power management circuit 140 is connected to the power supply unit 330, so that the display power management circuit 140 receives the operating power and generates driving power to drive the display panel 110.

As shown in FIG. 1, FIG. 2, and FIG. 3, the data processing circuit 310, the wireless communication module 320, the power supply unit 330 are disposed in the apparatus housing 350, and the apparatus connector 340 is disposed on a surface of the apparatus housing 350. The apparatus connector 340 is configured to be connected to the display connector 130 to connect the data processing circuit 310 to the display panel 110, connect the proximity sensor 200 to the data processing circuit 310, and connect the wireless communication module 320 to the external antenna 400. The data processing circuit 310 may output the display signal to the display panel 110 through the apparatus connector 340 and the display connector 130. The electrical connection between the apparatus connector 340 and the display connector 130 may be direct insertion into each other or a connection through a cable.

Figure 4:
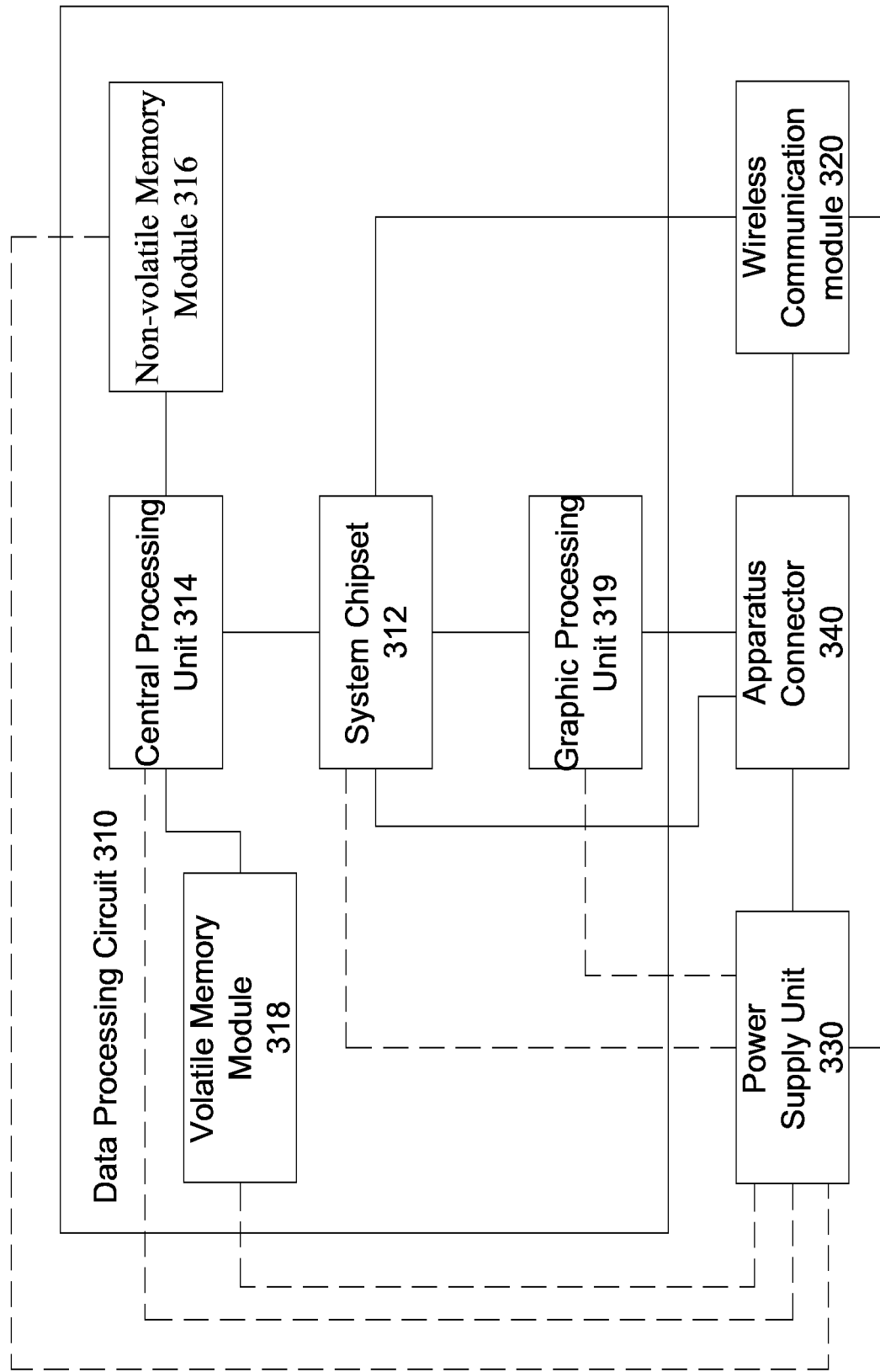
FIG. 4 is a circuit block diagram of a data processing circuit according to the first embodiment of the present invention.

As shown in FIG. 3 and FIG. 4, in the present invention, the data processing circuit 310 may be hardware, or a combination of hardware and software. For example, the data processing circuit 310 may further include a system chipset 312, a central processing unit 314, a non-volatile memory module 316, a volatile memory module 318, and a graphic processing unit 319. The non-volatile memory module 316 is configured to store program codes. The central processing unit 314 may load the program codes from a non-volatile memory to a volatile memory and execute the program codes to start an operating mode switching program. The above description is merely an example of the data processing circuit 310. Some or all of the elements may also be integrated into a single integrated circuit element, or the above elements may be replaced with other circuit designs as the data processing circuit 310.

As shown in FIG. 1, FIG. 2, and FIG. 3, in this embodiment, a number of external antennas 400 is exemplified as two, but an actual number is not limited to two. The external antenna 400 may be directly or indirectly electrically connected to the wireless communication module 320. In this embodiment, the display device 100 includes an antenna connection port 160 electrically connected to the display connector 130. The external antenna 400 is connected to the antenna connection port 160 to be indirectly electrically connected to the wireless communication module 320 through the display connector 130 and the apparatus connector 340.

The wireless communication module 320 may be, but is not limited to, a 3G/4G/5G mobile data module, and signal reception and transmission quality of the antenna of the wireless communication module includes a signal reception strength and a signal transmission strength. The signal reception strength depends on a transmitting station and surroundings, and the signal transmission strength may be switched by the wireless communication module 320. In addition to an operating system and an operating mode switching program, the non-volatile memory module 316 further stores antenna setup parameters for the first antenna control mode and the second antenna control mode, which are loaded by the data processing circuit 310 to control signal strengths (a transmission power in a unit of dBm or mKw) of wireless signals transmitted by the wireless communication module 320 through the internal antenna 120 and the external antenna 400. The 5G mobile data module may include eight wireless signal channels. Therefore, the total number of external antennas 400 and internal antennas 120 may be increased to eight, for example, four external antennas 400 and four internal antennas 120.

Figure 5:
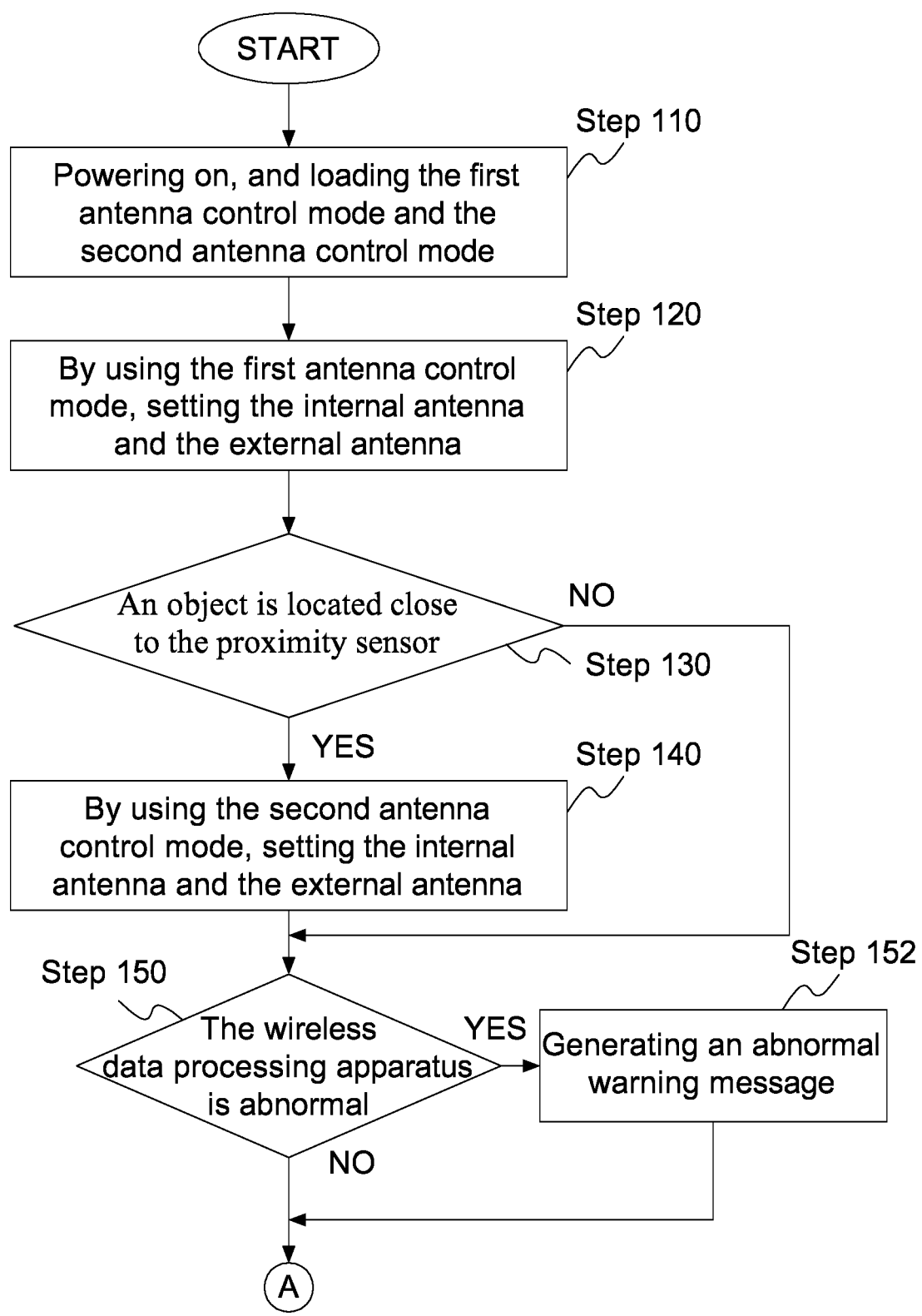
FIG. 5 and FIG. 6 are flowcharts of the data processing system capable of optimizing multiple antennas according to the first embodiment of the present invention.

As shown in FIG. 3 and FIG. 5, after the apparatus connector 340 is activated, the data processing circuit 310 loads the operating system and the operating mode switching program for power on, and loads the first antenna control mode and the second antenna control mode, as shown in step 110.

The antenna setup parameters of the first antenna control mode are optimized for the external antenna 400 and the internal antenna 120. The expression "optimized setup" further includes setup of a frequency band for using the antenna in addition to the setup of the signal strength. For example, there may be multiple available frequency bands between the antenna and a wireless base station of a mobile data provider. In a certain frequency band, a relatively good data transmission effect (uplink and downlink transmission rates) can be obtained without a need of a high signal strength of a transmitted wireless signal. In this case, the antenna setup parameter may be the frequency band which is designated as a working frequency band and a corresponding signal strength. Therefore, the expression "optimization" is not limited to an increase in the signal strength, but also includes the working frequency band and selection of an appropriate signal strength to reduce a load of the wireless signal module and avoid an excessively high temperature of the wireless signal module.

In addition, through the connection between the apparatus connector 340 and the display connector 130, the data processing circuit 310 transmits the display signal to the display panel 110, and the power supply unit 330 transmits the operating power to the display power management circuit 140, to activate the display device 100 and display an image through the display panel 110.

As shown in FIG. 3 and FIG. 5, next, the data processing circuit 310 activates the first antenna control mode, and normally controls, by using the first antenna control mode, the wireless communication module 320 to set the signal transmission strengths at which the internal antenna 120 and the external antenna 400 transmit wireless signals, as shown in step 120. In step 120, the data processing circuit 310 may temporarily stop outputting the display signal, so that the display panel 110 temporarily enters a sleeping mode without display.

As shown in FIG. 3 and FIG. 5, the proximity sensor 200 continuously obtains a sensed distance value, and the data processing circuit 310 continuously determines whether the sensed distance value is less than a threshold value to determine whether the object is located close to the proximity sensor (whether a user is located close to the proximity sensor), as shown in step 130.

When the sensed distance value is less than the threshold value, the data processing circuit 310 determines that the proximity sensor 200 detects that the object is located close to the proximity sensor (the user is located close to the proximity sensor), and the data processing circuit 310 stops the first antenna control mode and activates the second antenna control mode. The data processing circuit 310 controls the transmission strengths at which the internal antenna 120 and the external antenna 400 transmit wireless signals by using the second antenna control mode, as shown in step 140. If the display panel 110 temporarily enters the sleeping mode, the data processing circuit 310 starts to output a display signal and wakes up the display panel 110.

When an object is located close to the proximity sensor (a user is located close to the proximity sensor), the user usually needs to start to use the display device 100. In other words, the user is to be located close to the internal antenna 120. In order to prevent the user from bearing relatively strong electromagnetic waves, the second antenna control mode at this time includes decreasing the transmission strength at which the internal antenna 120 transmits the wireless signal. The external antenna 400 is disposed relatively far away, for example, disposed beside a window, so that the external antenna 400 can be maintained in the optimal setup. Specifically, in the second antenna control mode, an upper limit value is set for the transmission strength at which the internal antenna 120 transmits the wireless signal. The transmission strength is not allowed to exceed the upper limit value.

As shown in FIG. 3 and FIG. 5, the data processing circuit 310 continuously monitors a status of the wireless data processing apparatus 300 to determine whether the wireless data processing apparatus 300 is abnormal, as shown in step 150. The apparatus abnormality includes, but is not limited to, problems that may cause a decrease in system efficiency, such as a system ambient temperature is higher than an ambient temperature threshold, a temperature of the data processing circuit 310 being higher than a circuit temperature threshold, a load of the data processing circuit 310 being higher than a load threshold, and the like. If the wireless data processing apparatus 300 is abnormal, the data processing circuit 310 generates an abnormal warning message and drives the display panel 110 to display the abnormal warning message, as shown in step 152. The abnormal warning message may include a cause of the abnormality of the apparatus.

Figure 6:
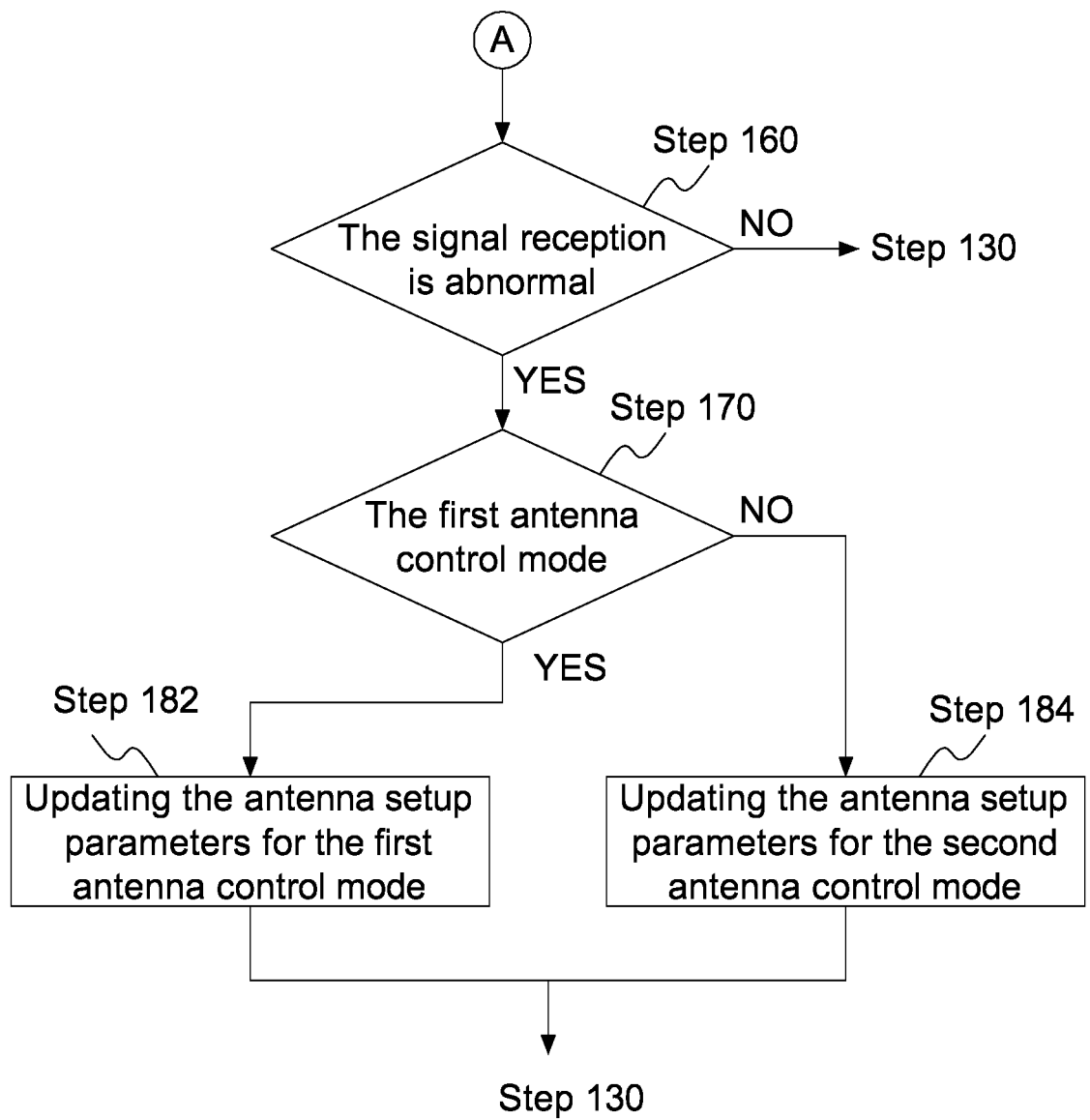

As shown in FIG. 3 and FIG. 6, the data processing circuit 310 also monitors signal reception statuses of the antennas to determine whether the signal reception is abnormal, as shown in step 160. If the signal reception is abnormal, the data processing circuit 310 adjusts the antenna setup parameters of the external antenna 400 and the internal antenna 120, including but not limited to adjusting the signal strength and changing the working frequency band. In this case, if the second antenna control mode is being executed, the data processing circuit 310 updates the antenna setup parameters for the first antenna control mode, as shown in step 170 and step 182. If the second antenna control mode is being executed, the data processing circuit 310 updates the antenna setup parameters for the second antenna control mode, as shown in step 170 and step 184. Finally, the data processing circuit 310 performs step 130 to continuously determine whether an object is located close to the proximity sensor (whether a user is located close to the proximity sensor).

Figure 7:
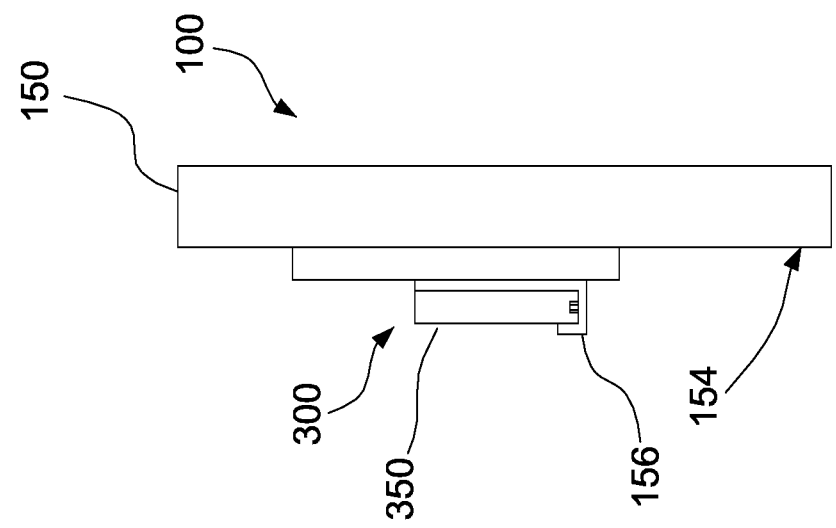
FIG. 7 and FIG. 8 are side views of partial elements of a data processing system capable of optimizing multiple antennas according to a second embodiment of the present invention.
Figure 8:
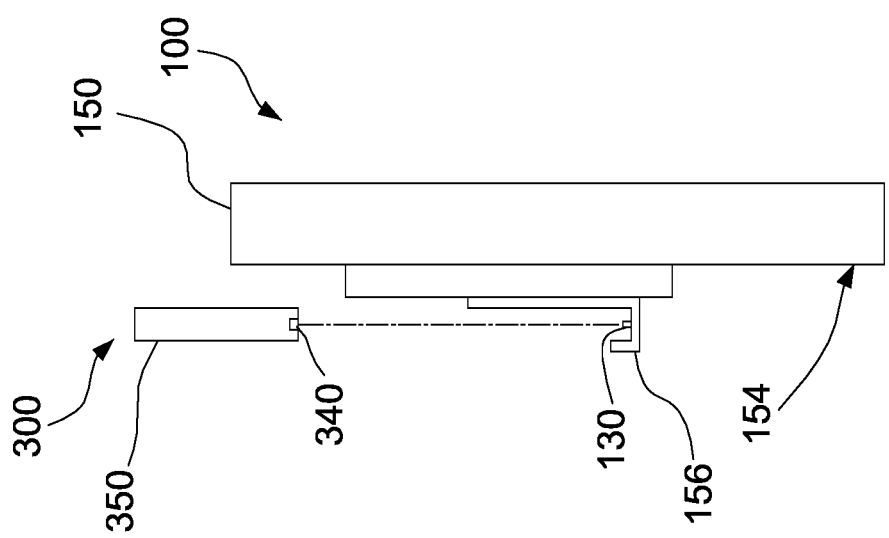

FIG. 7 and FIG. 8 show a data processing system capable of optimizing multiple antennas according to a second embodiment of the present invention. In the second embodiment, the display housing 150 further includes a mounting base 156 disposed on the back side 154, and the display connector 130 is disposed in the mounting base 156. A shape of an apparatus housing 350 matches an accommodation space of the mounting base 156 and is detachably disposed on the mounting base 156, and the apparatus connector 340 is connected to the display connector 130. Therefore, in the second embodiment, the wireless data processing apparatus 300 and the display device 100 may be combined into a single one.

Specific description of pins of the apparatus connector 340 and the display connector 130 is as follows.

The apparatus connector 340 and the display connector 130 each include an expansion port connection pin, a display signal transmission pin, a power transmission pin, an antenna signal transmission pin, and a detection pin. The expansion port connection pin includes but is not limited to a USB port pin configured to connect an expansion port of the data processing circuit to an expansion port on the display device. The display signal transmission pin may be a pin configuration that meets display signal specifications such as EDP, LVDS, DP, HDMI, and the like, and is configured to connect the graphic processing unit 319 of the data processing circuit 310 to the display panel 110 to transmit the display signal to the display panel 110. The power transmission pin is configured to connect the power supply unit 330 to the display power management circuit 140. The antenna signal transmission pin is configured to connect the wireless communication module 320 to the internal antenna 120 and the external antenna 400. The detection pin may be configured to connect the distance detector of the proximity sensor 200 to the data processing circuit 310, that is, the distance detector may be electrically connected to the display connector 130 and is connected to the data processing circuit 310 through the apparatus connector 340 and the display connector 130. In addition, the apparatus connector 340 and the display connector 130 may also be equipped with other signal transmission pins, so that the data processing circuit 310 can be configured to control the elements, for example, a decorative lamp set, disposed in the display device 100. In a specific embodiment, the apparatus connector 340 may be a slot, and is connected to the data processing circuit 310 through a flat cable, and the display connector 130 may be a card edge connector (a gold finger) disposed on the back side 154 of a housing of the display device 100 or disposed on the mounting base 156.

Figure 9:
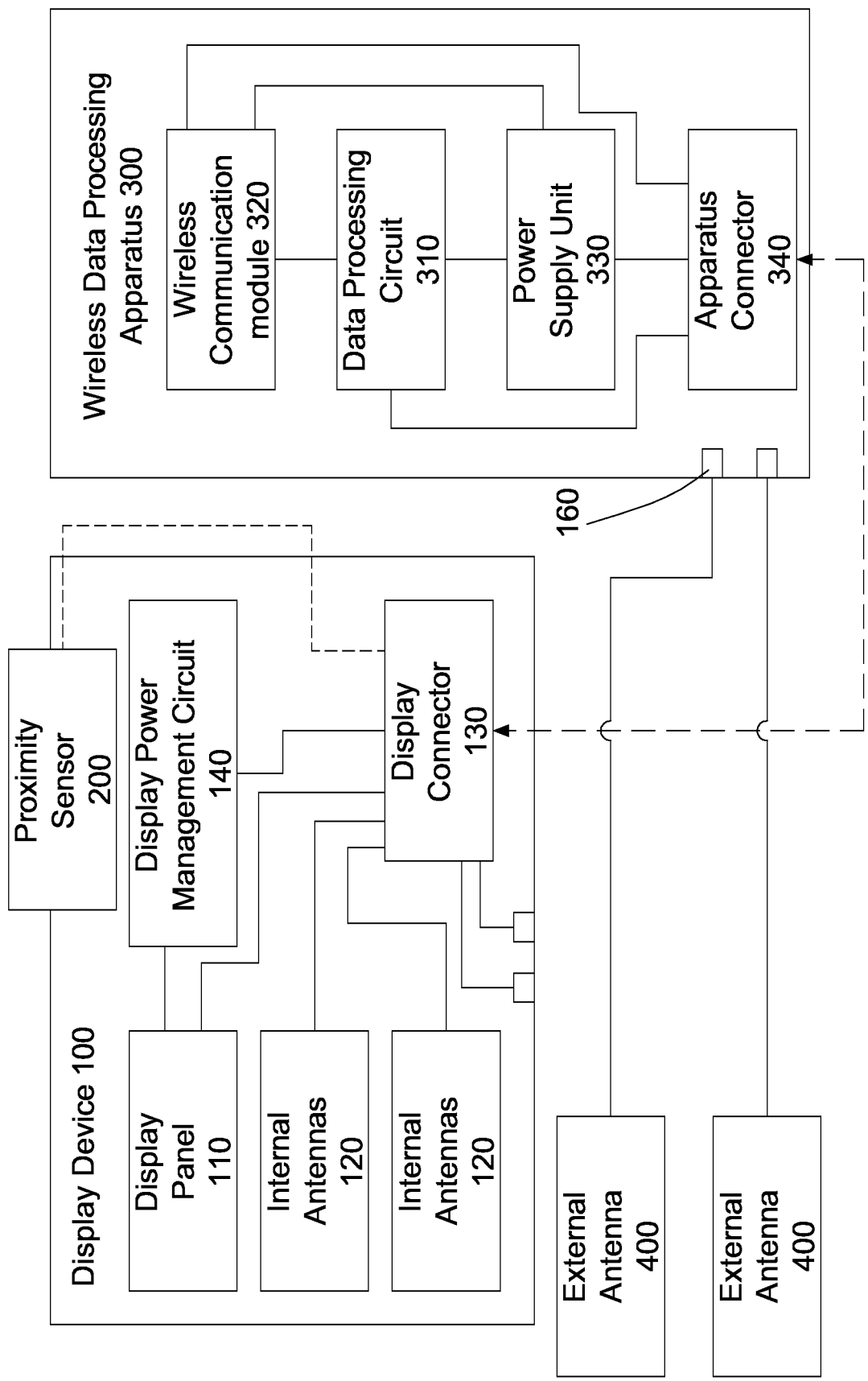
FIG. 9 is a circuit block diagram of a data processing system capable of optimizing multiple antennas according to a third embodiment of the present invention.

FIG. 9 shows a data processing system capable of optimizing multiple antennas according to a third embodiment of the present invention. In the third embodiment, the antenna connection port 160 is disposed in the wireless data processing apparatus 300 and is directly electrically connected to the wireless communication module 320. The external antenna 400 is connected to the antenna connection port 160 to be electrically connected to the wireless communication module 320. In the third embodiment, signal pins of the display connector 130 and the apparatus connector 340 corresponding to the external antenna 400 may be omitted.

Figure 10:
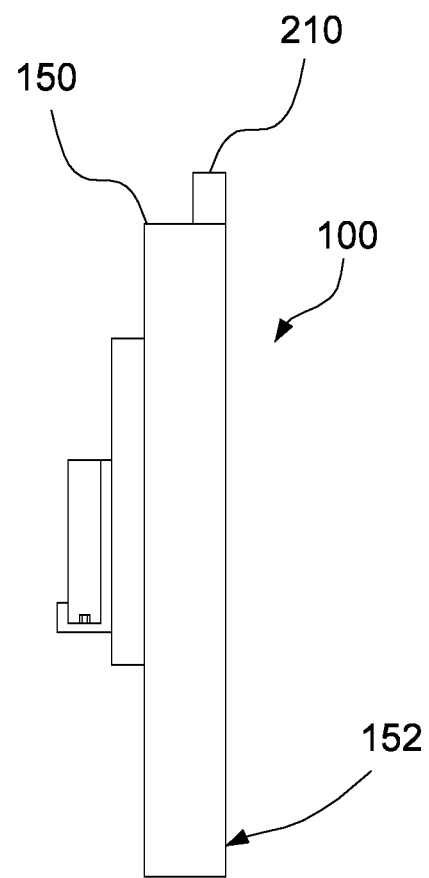
FIG. 10 is a side view of partial elements of a data processing system capable of optimizing multiple antennas according to a fourth embodiment of the present invention.
Figure 11:
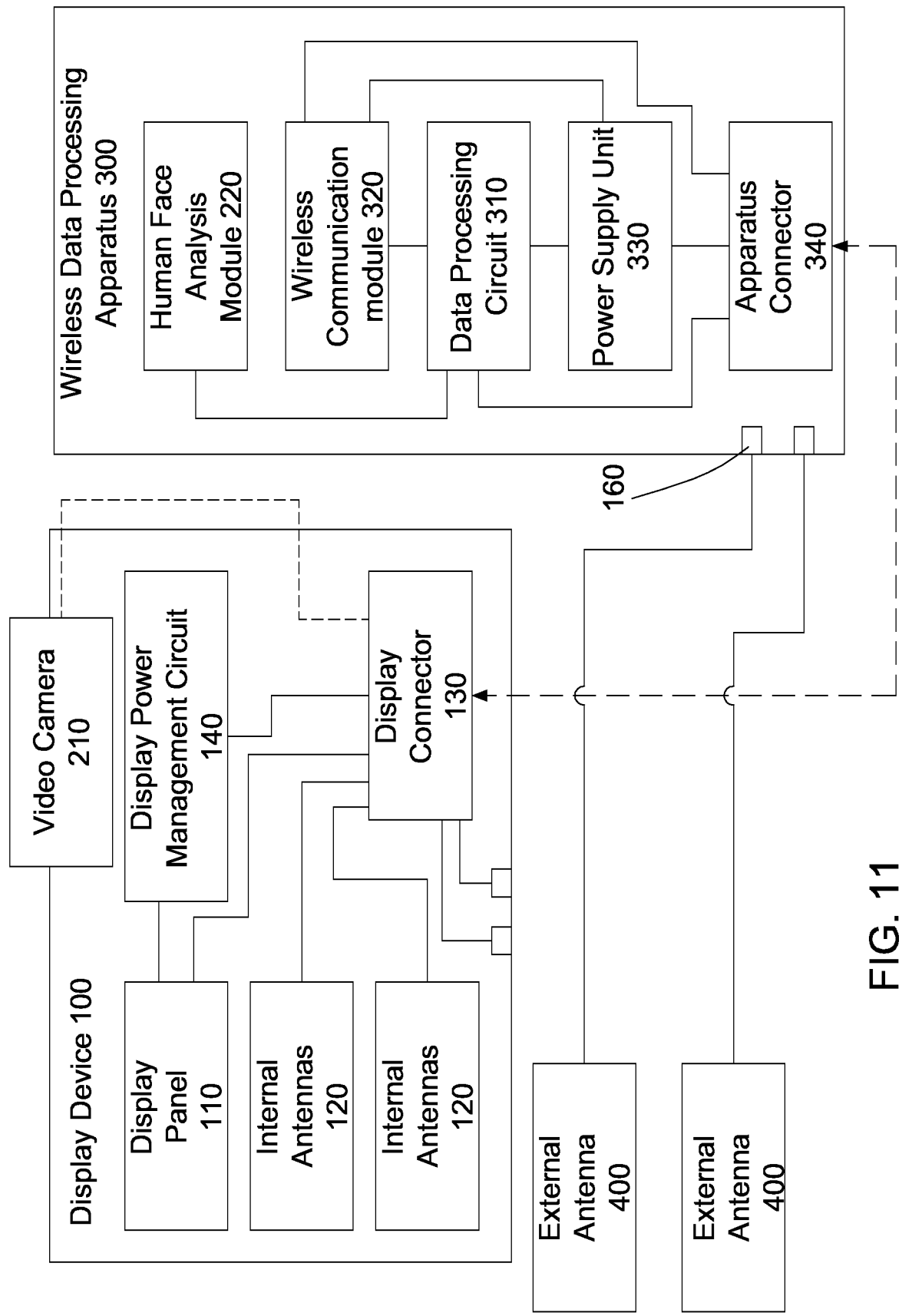
FIG. 11 is a circuit block diagram of a data processing system capable of optimizing multiple antennas according to a fourth embodiment of the present invention.

FIG. 10 and FIG. 11 show a data processing system capable of optimizing multiple antennas according to a fourth embodiment of the present invention. In the fourth embodiment, the proximity sensor includes a video camera 210 and a human face analysis module 220. The video camera 210 is disposed on the front side 152 of the display housing 150 and is configured to continuously capture a detected image. The human face analysis module 220 is configured to receive the detected image, and continuously analyze the detected image to determine whether a human face exists in the detected image and whether a ratio of an area of the human face to an area of the detected image exceeds a threshold ratio. When the human face exists in the detected image, and the ratio exceeds the threshold ratio, the data processing circuit 310 determines that the proximity sensor 200 detects that the object is located close to the proximity sensor (a user is located close to the proximity sensor).

Figure 12:
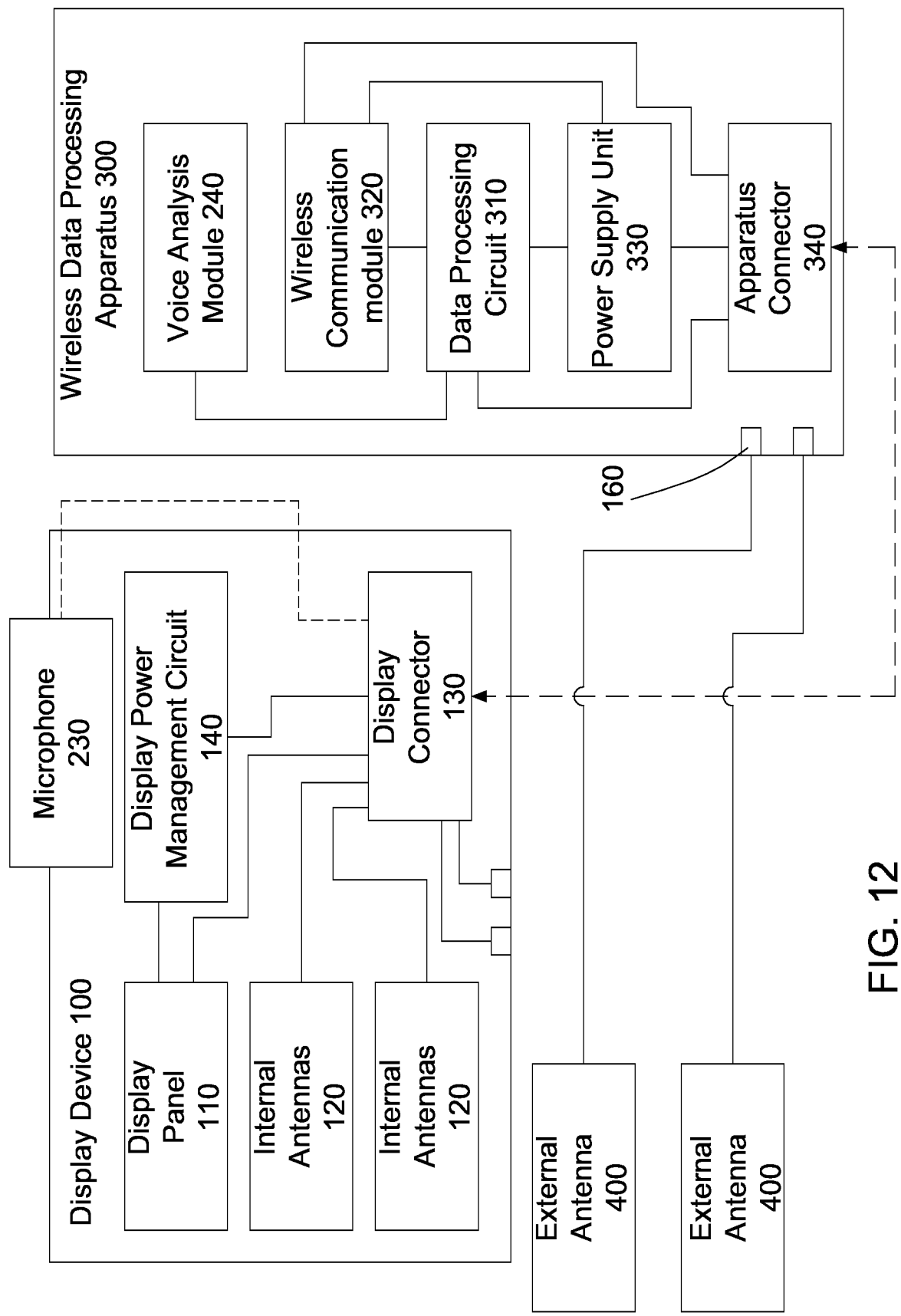
FIG. 12 is a circuit block diagram of a data processing system capable of optimizing multiple antennas according to a fifth embodiment of the present invention.

FIG. 12 shows a data processing system capable of optimizing multiple antennas according to a fifth embodiment of the present invention. In the fifth embodiment, the proximity sensor 200 includes a microphone 230 and a voice analysis module 240. The microphone 230 is configured to continuously capture a sound. The voice analysis module 240 is configured to receive the sound, and continuously analyze the sound to determine whether a voice exists in the sound, and whether a voice decibel level of the voice is greater than a threshold decibel level. When the voice exists in the sound and the voice decibel level is greater than threshold decibel level, the data processing circuit 310 determines that the proximity sensor 200 detects that the object is located close to the proximity sensor (the user is located close to the proximity sensor).

The above human face analysis module 220 and voice analysis module 240 may be implemented by hardware or software. During implementation by software, the data processing circuit 310 loads program codes and executes the program codes. In addition, the proximity sensors 200 in the embodiments may be implemented in combination, and different mechanisms are used to determine whether an object is located close to the proximity sensor, so as to reduce erroneous determination or missing determination.

Figure 13:
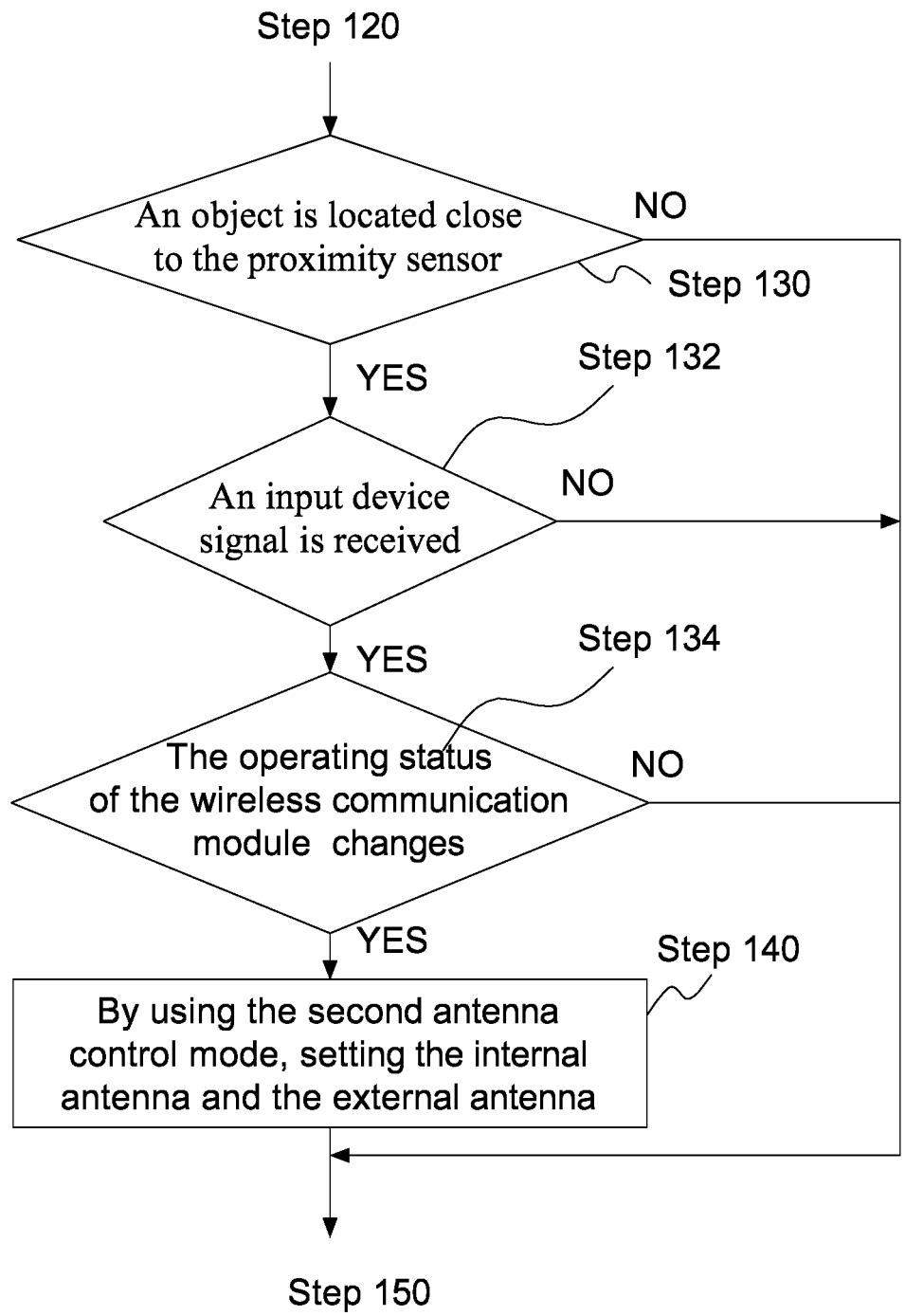
FIG. 13 is a flowchart of a data processing system capable of optimizing multiple antennas according to one or more embodiments of the present invention.

Referring to FIG. 13, in one or more embodiments, the data processing circuit 310 may monitor an input device to determine whether an input device signal generated by the input device is received, as shown in step 132. The input device includes but is not limited to a keyboard, a mouse, and a touchpad. The data processing circuit 310 is switched to the second antenna control mode by using that the object is located close to the proximity sensor and that the input device is being operated (reception of the input device signal) as a trigger condition, so that it can be correctly determined that the user is using the display device 100, thereby avoiding determining the user passing by as the user being using the display device 100 under the single condition that the object is located close to the proximity sensor. An operation of the user also changes the operating status of the wireless communication module 320. Therefore, the data processing circuit 310 may determine that the operating status of the wireless communication module 320 changes by monitoring a data transmission flow of the wireless communication module 320, the signal strengths of the antennas, a noise strength, a data transmission flow of a wireless receiving module, and the like, thereby determining that the object is located close to the proximity sensor (the user is located close to the proximity sensor) and that the display device 100 is being used, as shown in step 134.

In the data processing system capable of optimizing multiple antennas of the present invention, the wireless data processing apparatus 300 can be easily disassembled and replaced to be connected to different display devices 100, and can be quickly integrated into the antenna (the internal antenna 120 and the external antenna 400). Moreover, the data processing system capable of optimizing multiple antennas can detect use of the display device 100 by the user, and properly switch the signal transmission strengths of the antennas, so that the optimal configuration of the antennas can be effectively achieved and a relatively good data transmission rate can be maintained.

What is claimed is:

1. A data processing system capable of optimizing multiple antennas, comprising:
   a display device equipped with a display panel, at least one internal antenna, and a display connector, wherein the display connector is electrically connected to the display panel and the at least one internal antenna;
   a proximity sensor electrically connected to the display connector and configured to detect whether an object is located close to the proximity sensor;
   a wireless data processing apparatus equipped with a data processing circuit, a wireless communication module, and an apparatus connector, wherein the data processing circuit and the wireless communication module are electrically connected to the apparatus connector, and the wireless communication module is electrically connected to the data processing circuit; and
   at least one external antenna, directly or indirectly electrically connected to the wireless communication module;
   wherein the apparatus connector is configured to be connected to the display connector to connect the data processing circuit to the display panel, connect the proximity sensor to the data processing circuit, and connect the at least one internal antenna to the wireless communication module, and the data processing circuit is configured to output a display signal to the display panel; and wherein the data processing circuit normally controls the wireless communication module to set signal transmission strengths of the at least one internal antenna and the at least one external antenna by using a first antenna control mode, when the proximity sensor detects that the object is located close to the proximity sensor, the data processing circuit controls the wireless communication module to set the signal transmission strengths of the at least one internal antenna and the at least one external antenna by using a second antenna control mode, and the second antenna control mode comprises at least decreasing the signal transmission strength of the at least one internal antenna.

2. The data processing system capable of optimizing multiple antennas according to claim 1, wherein when the proximity sensor detects that the object is located close to the proximity sensor, the data processing circuit further determines whether an input device signal is received, and when the object is located close to the proximity sensor, and the input device signal is received, the data processing circuit controls the wireless communication module by using the second antenna control mode.

3. The data processing system capable of optimizing multiple antennas according to claim 1, wherein when the proximity sensor detects that the object is located close to the proximity sensor, and an operating status of the wireless communication module changes, the data processing circuit controls the wireless communication module by using the second antenna control mode.

4. The data processing system capable of optimizing multiple antennas according to claim 1, wherein the wireless data processing apparatus is further equipped with a power supply unit electrically connected to the apparatus connector, the power supply unit is configured to provide operating power to drive the data processing circuit and the wireless communication module, and the power supply unit outputs the operating power through the apparatus connector.

5. The data processing system capable of optimizing multiple antennas according to claim 4, wherein the display device further comprises a display power management circuit electrically connected to the display panel and the display connector, and the apparatus connector is connected to the display connector, so that the display power management circuit receives the operating power and generates driving power to drive the display panel.

6. The data processing system capable of optimizing multiple antennas according to claim 5, wherein the display device further comprises a display housing, the display housing has a front side and a back side, the display panel is disposed on the front side, and the display power management circuit and the at least one internal antenna are disposed in the display housing.

7. The data processing system capable of optimizing multiple antennas according to claim 6, wherein the wireless data processing apparatus further comprises an apparatus housing, the data processing circuit, the wireless communication module, and the power supply unit are disposed in the apparatus housing, and the apparatus connector is disposed on a surface of the apparatus housing.

8. The data processing system capable of optimizing multiple antennas according to claim 7, wherein the display housing further comprises a mounting base disposed on the back side, the display connector is disposed on the mounting base, and the apparatus housing is detachably disposed on the mounting base and is connected to the display connector through the apparatus connector.

9. The data processing system capable of optimizing multiple antennas according to claim 1, wherein in the first antenna control mode, the data processing circuit temporarily stops outputting the display signal.

10. The data processing system capable of optimizing multiple antennas according to claim 1, wherein the apparatus connector and the display connector are connected to each other through direct insertion or through a cable.

11. The data processing system capable of optimizing multiple antennas according to claim 1, wherein the display device further comprises an antenna connection port electrically connected to the display connector, and the at least one external antenna is connected to the antenna connection port to be electrically connected to the wireless communication module through the display connector and the apparatus connector.

12. The data processing system capable of optimizing multiple antennas according to claim 1, wherein the wireless data processing apparatus further comprises an antenna connection port electrically connected to the wireless communication module, and the at least one external antenna is connected to the antenna connection port to be electrically connected to the wireless communication module.

13. The data processing system capable of optimizing multiple antennas according to claim 1, wherein the data processing circuit determines whether the wireless data processing apparatus is abnormal, and if the wireless data processing apparatus is abnormal, the data processing circuit generates an abnormal warning message and drives the display panel to display the abnormal warning message.

14. The data processing system capable of optimizing multiple antennas according to claim 1, wherein the data processing circuit determines whether signal reception of the at least one internal antenna and the at least one external antenna is abnormal, and if the signal reception is abnormal, the data processing circuit adjusts antenna setup parameters of the external antenna and the at least one internal antenna.

15. The data processing system capable of optimizing multiple antennas according to claim 14, wherein if the first antenna control mode is being executed, the data processing circuit updates the antenna setup parameters for the first antenna control mode, and if the second antenna control mode is being executed, the data processing circuit updates the antenna setup parameters for the second antenna control mode.

16. The data processing system capable of optimizing multiple antennas according to claim 1, wherein the proximity sensor is a distance detector configured to continuously obtain a sensed distance value, and the data processing circuit continuously determines whether the sensed distance value is less than a threshold value to determine whether the object is located close to the proximity sensor.

17. The data processing system capable of optimizing multiple antennas according to claim 1, wherein the proximity sensor comprises a video camera and a human face analysis module, the video camera is configured to continuously capture a detected image, the human face analysis module is configured to receive the detected image and continuously analyze the detected image to determine whether a human face exists in the detected image and whether a ratio of an area of the human face to an area of the detected image exceeds a threshold ratio, and when the human face exists in the detected image and the ratio exceeds the threshold ratio, the data processing circuit determines that the proximity sensor detects that the object is located close to the proximity sensor.

18. The data processing system capable of optimizing multiple antennas according to claim 1, wherein the proximity sensor comprises a microphone and a voice analysis module, the microphone is configured to continuously capture a sound, the voice analysis module is configured to receive the sound and continuously analyze the sound to determine whether a voice exists in the sound and whether a voice decibel level of the voice is greater than a threshold decibel level, and when the voice exists in the sound, and the voice decibel level is greater than the threshold decibel level, the data processing circuit determines that the proximity sensor detects that the object is located close to the proximity sensor.

* * * * *